US010542653B1

(12) United States Patent
Liversedge (10) Patent No.: US 10,542,653 B1
(45) Date of Patent: Jan. 28, 2020

(54) LIGHT EMITTING SHOVEL ASSEMBLY (71) Applicant: Jerome Liversedge, Marion, MT (US)

(72) Inventor: Jerome Liversedge, Marion, MT (US)

(*) Notice: Subject to any disclaimer, the term of this patent is extended or adjusted under 35 U.S.C. 154(b) by 0 days.

(21) Appl. No.: 16/249,694

(22) Filed: Jan. 16, 2019

(51) Int. Cl.
A01B 1/02 (2006.01)
E01H 5/02 (2006.01)
F21V 33/00 (2006.01)
F21V 23/04 (2006.01)
H05B 3/50 (2006.01)

(52) U.S. Cl.
CPC .............. A01B 1/02 (2013.01); E01H 5/02 (2013.01); F21V 23/04 (2013.01); F21V 33/00 (2013.01); H05B 3/50 (2013.01)

(58) Field of Classification Search
CPC .. A01B 1/02; A01B 1/026; E01H 5/02; E01H 2001/1226; F21V 23/04; F21V 33/00; F21V 33/0084; H05B 3/48; H05B 3/50
USPC .............................. 294/54.5, 57, 58, 59, 178
See application file for complete search history.

(56) References Cited

U.S. PATENT DOCUMENTS

| 6,869,118 | B2 | 3/2005 | Bradford | |
|---|---|---|---|---|
| 7,303,300 | B2 | 12/2007 | Dowling | |
| D570,653 | S | 6/2008 | Baker | |
| 7,484,859 | B1* | 2/2009 | Burke | A47L 13/52 15/257.1 |
| 8,550,516 | B2 | 10/2013 | Best | |
| 8,708,382 | B2 | 4/2014 | Hernandez | |
| 8,800,175 | B1* | 8/2014 | Faraci | E01H 5/02 294/54.5 |
| 10,000,901 | B1* | 6/2018 | Gallo | A01B 1/022 |
| 2008/0272103 | A1* | 11/2008 | Farrington | A01K 27/003 219/201 |
| 2010/0164239 | A1 | 7/2010 | Grennan | |
| 2015/0115634 | A1 | 4/2015 | Young | |
| 2017/0370058 | A1* | 12/2017 | Herrera | E01H 5/02 |

* cited by examiner

Primary Examiner — Dean J Kramer (57) ABSTRACT

A light emitting shovel assembly includes a shovel that has a shaft, a bucket that is coupled to the shaft and a handle that is removably coupled to a distal end of the shaft. The bucket is comprised of a translucent material for to passing light therethrough. A handle roller is rotatably coupled to the handle and the handle can be gripped. A shaft roller is rotatably positioned around the shaft and the shaft roller can be gripped. A handle heating coil is integrated into the handle roller to warm the user's hand and a shaft heating coil is integrated into the shaft roller to warm the user's hand. A shaft light emitter is coupled to the shaft to illuminate a work area with respect to the bucket. A bucket light emitter is coupled to the bucket and an auxiliary light emitter is coupled to the shaft.

12 Claims, 6 Drawing Sheets

LIGHT EMITTING SHOVEL ASSEMBLY

CROSS-REFERENCE TO RELATED APPLICATIONS

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

(2) Description of Related Art Including Information Disclosed Under 37 CFR 1.97 and 1.98

The disclosure and prior art relates to shovel devices and more particularly pertains to a new shovel device for warming a user's hands and emitting light.

BRIEF SUMMARY OF THE INVENTION

An embodiment of the disclosure meets the needs presented above by generally comprising a shovel that has a shaft, a bucket that is coupled to the shaft and a handle that is removably coupled to a distal end of the shaft. The bucket is comprised of a translucent material for to passing light therethrough. A handle roller is rotatably coupled to the handle and the handle can be gripped. A shaft roller is rotatably positioned around the shaft and the shaft roller can be gripped. A handle heating coil is integrated into the handle roller to warm the user's hand and a shaft heating coil is integrated into the shaft roller to warm the user's hand. A shaft light emitter is coupled to the shaft to illuminate a work area with respect to the bucket. A bucket light emitter is coupled to the bucket and an auxiliary light emitter is coupled to the shaft.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
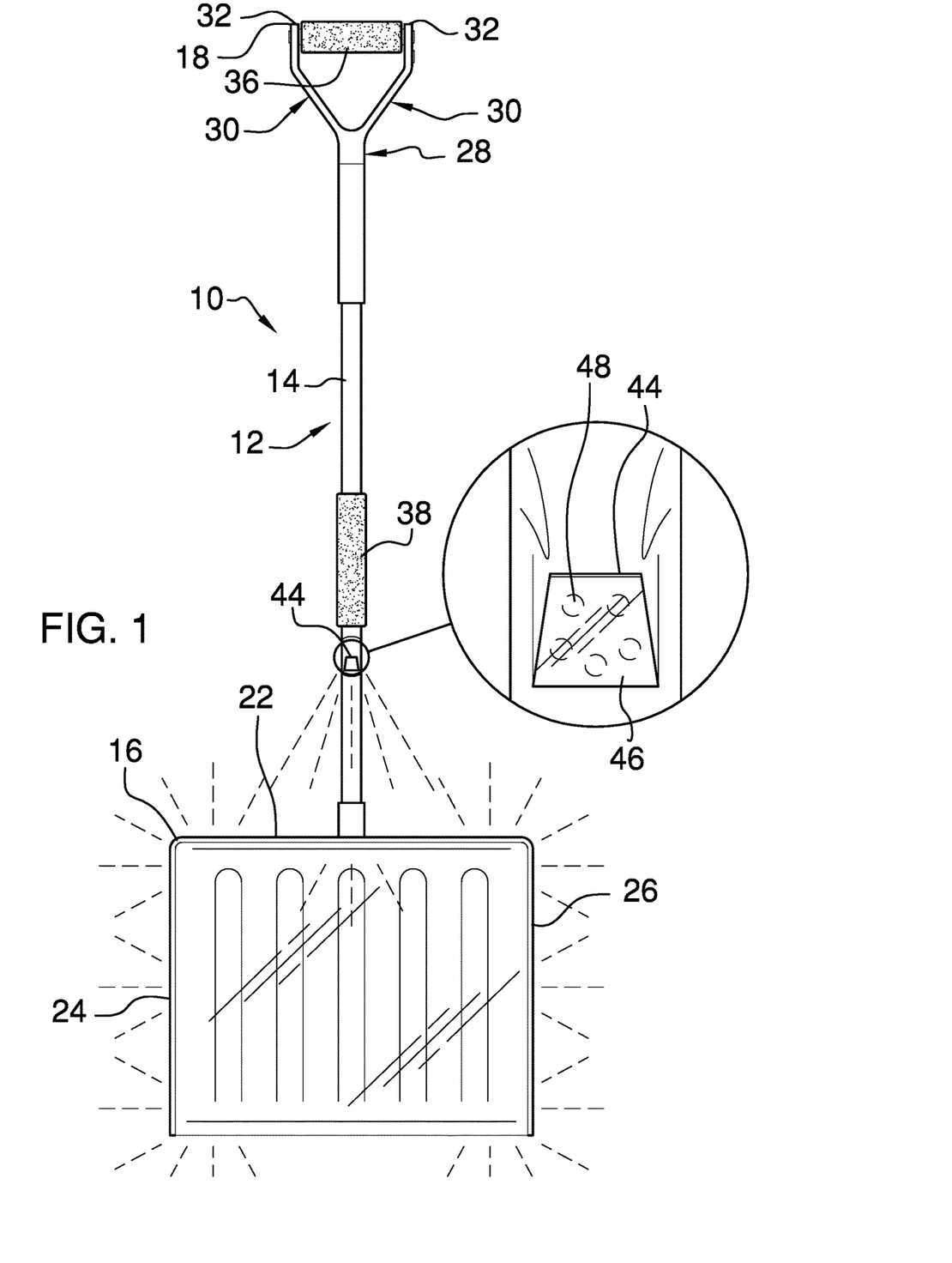
FIG. 1 is a front view of a light emitting shovel assembly according to an embodiment of the disclosure.
Figure 2:
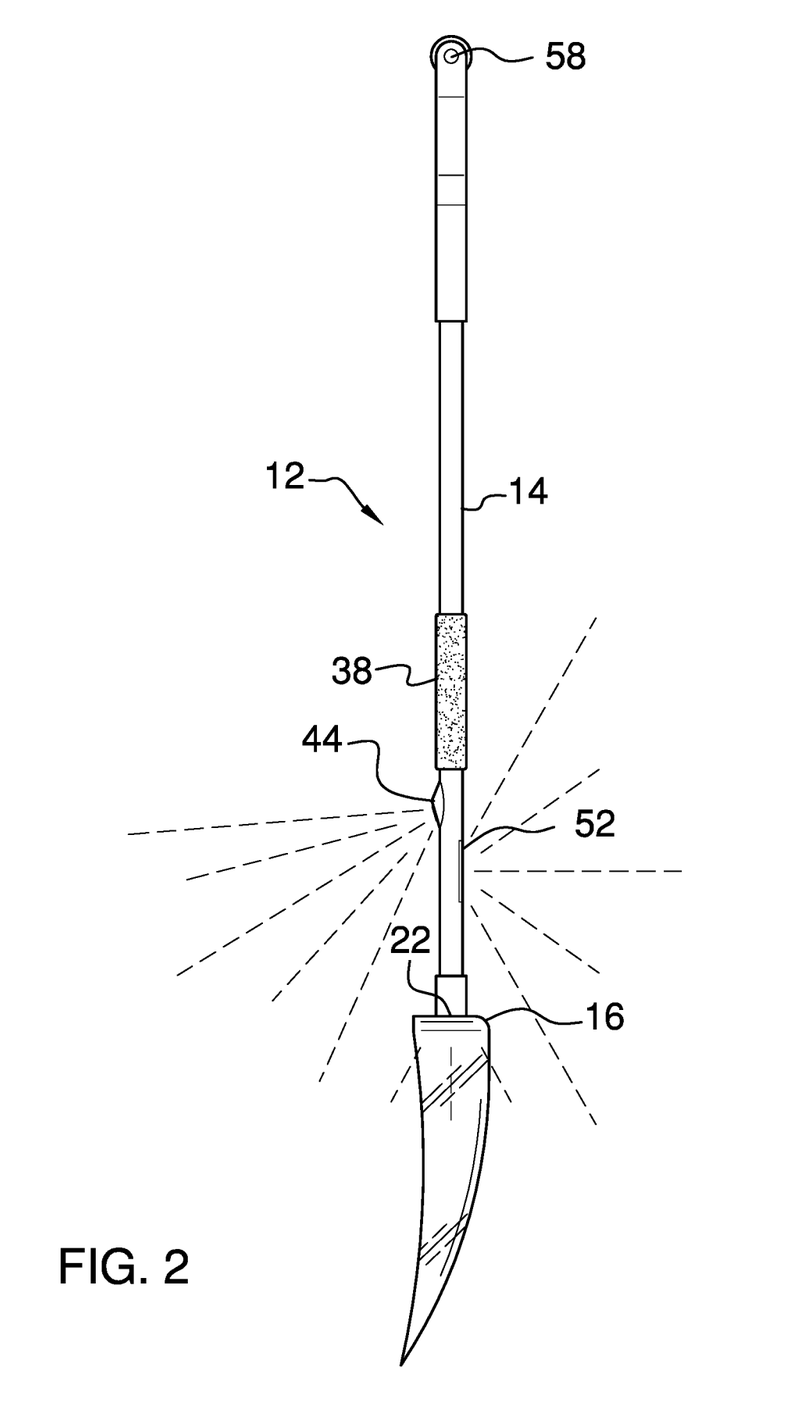
FIG. 2 is a left side view of an embodiment of the disclosure.
Figure 3:
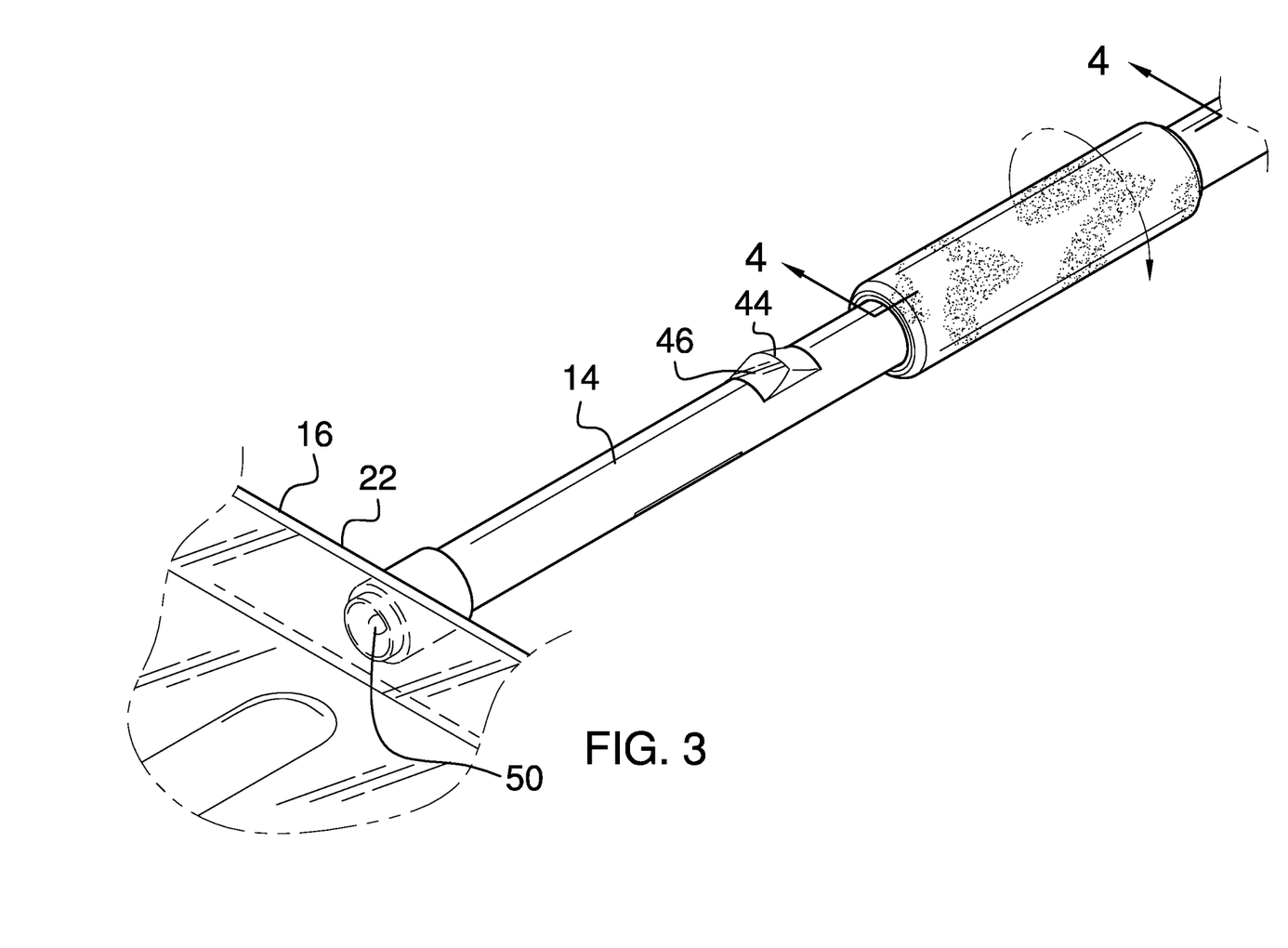
FIG. 3 is a top perspective view of an embodiment of the disclosure.
Figure 4:
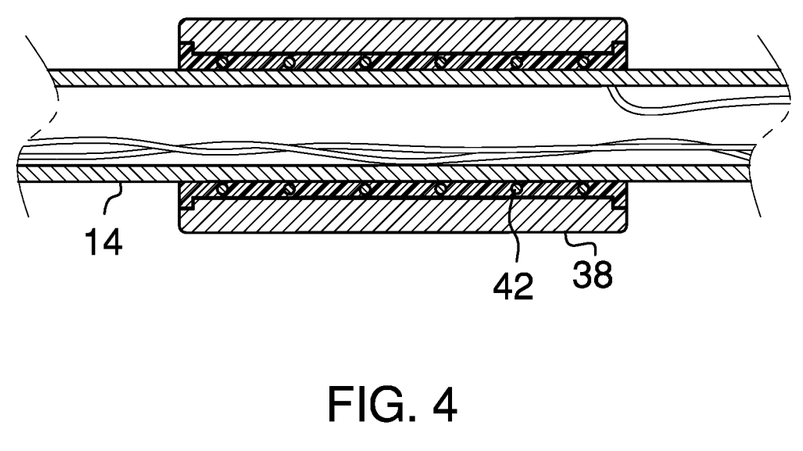
FIG. 4 is a cross sectional view taken along line 4-4 of FIG. 3 of an embodiment of the disclosure.
Figure 5:
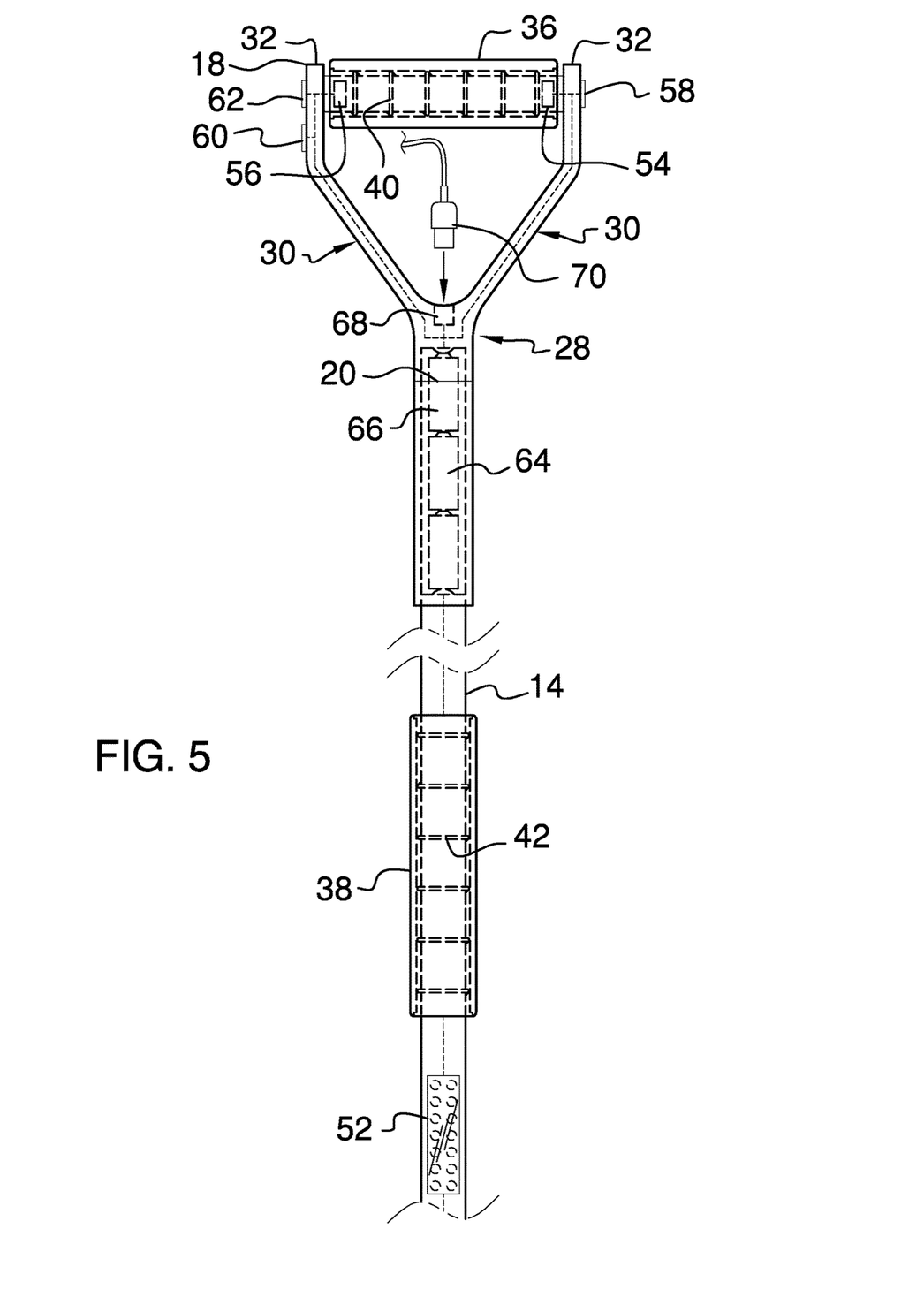
FIG. 5 is a front phantom view of an embodiment of the disclosure.
Figure 6:
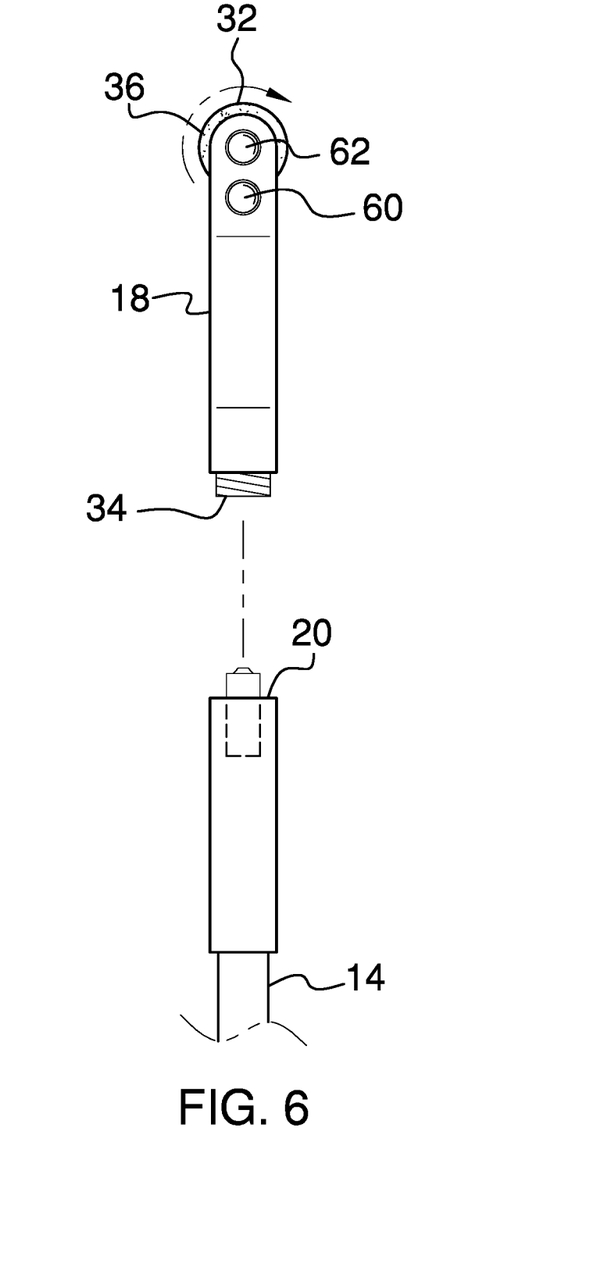
FIG. 6 is an exploded perspective view of an embodiment of the disclosure.

With reference now to the drawings, and in particular to FIGS. 1 through 6 thereof, a new shovel device embodying the principles and concepts of an embodiment of the disclosure and generally designated by the reference numeral 10 will be described.

As best illustrated in FIGS. 1 through 6, the light emitting shovel assembly 10 generally comprises a shovel 12 that has a shaft 14, a bucket 16 that is coupled to the shaft 14 and a handle 18 that is removably coupled to a distal end 20 of the shaft 14. The distal end 20 is open and the shaft 14 is hollow. The bucket 16 has a top edge 22, a first lateral edge 24 and a second lateral edge 26, and the shaft 14 is coupled to and extends upwardly form the top edge 22 of the bucket 16. The bucket 16 is comprised of a translucent material to pass light therethrough. Additionally, the bucket 16 may be structured in the convention of a snow shovel 12 or the like.

The handle 18 has a tubular section 28 that is oriented collinear with a pair of upright sections 30. Each of the upright sections 30 has a distal end 32 with respect to the tubular section 28, the tubular section 28 has a distal end 34 with respect to the upright sections 30 and the distal end 34 of the tubular section 28 is open. The upright sections 30 spread away from each other such that the distal end 32 of each of the upright sections 30 is spaced apart from each other. Thus, the handle 18 has a Y-shape. The distal end 34 of the tubular section 28 insertably receives the distal end 20 of the shaft 14.

A handle roller 36 is rotatably coupled between each of the upright sections 30 of the handle 18 and the handle roller 36 is gripped when the shovel 12 is used for shoveling. The handle roller 36 rotates about an axis extending through the distal end of each of the upright sections 30. Additionally, the handle roller 36 may be comprised of a resiliently compressible material to enhance comfort for the user. A shaft roller 38 is rotatably positioned around the shaft 14 and the shaft roller 38 is gripped when the shovel 12 is used for shoveling. The shaft roller 38 rotates about a longitudinal axis of the shaft 14 and the shaft roller 38 is comprised of a resiliently compressible material.

A handle heating coil 40 is integrated into the handle roller 36 such that the handle heating coil 40 is in thermal communication with the handle roller 36. The handle heating coil 40 heats the handle roller 36 when the handle heating coil 40 is turned on to warm the user's hand. The handle heating coil 40 may be an electric heating coil with an operational temperature ranging between approximately 90.0 degrees Fahrenheit and 100.0 degrees Fahrenheit. A shaft heating coil 42 is integrated into the shaft roller 38 such that the shaft heating coil 42 is in thermal communication with the shaft roller 38. The shaft heating coil 42 heats the shaft roller 38 when the shaft heating coil 42 is turned on to warm the user's hand. Additionally, the shaft heating coil 42 may be an electric heating coil with an operational temperature ranging between approximately 90.0 degrees Fahrenheit and 100.0 degrees Fahrenheit.

A light housing 44 is coupled to the shaft 14, the light housing 44 has a lens 46 thereon and the lens 46 is angled to point toward the bucket 16. A shaft light emitter 48 is positioned within the light housing 44 and the shaft light emitter 48 emits light outwardly through the lens 46 when the shaft light emitter 48 is turned on. In this way the shaft light emitter 48 illuminates a work area with respect to the bucket 16. A bucket light emitter 50 is coupled to the bucket 16 and the bucket light emitter 50 emits light through the bucket 16 when the bucket light emitter 50 is turned on. Thus, the bucket light emitter 50 illuminates the work area with respect to the bucket 16. The bucket light emitter 50 is positioned on the shaft 14 where the shaft 14 joins the top edge 22 of the bucket 16. An auxiliary light emitter 52 is coupled to the shaft 14 and the auxiliary light emitter 52 emits light outwardly from the shaft 14 when the auxiliary light emitter 52 is turned on. Each of the shaft 48, bucket 50 and auxiliary 52 light emitters may comprise an LED or the like.

A global positioning system (gps) transceiver 54 is coupled to the handle 18. The gps transceiver 54 is in wireless communication with a gps for determining a physical location of the handle 18. In this way the shovel 12 can be tracked when the shovel 12 is lost or stolen. A communication transceiver 56 is coupled to the handle 18 and the communication transceiver 56 is in wireless communication with an electronic device for transferring data. The communication transceiver 56 may be a radio frequency transceiver or the like and the communication transceiver may employ Bluetooth communication protocols.

A heat button 58 is movably coupled to the handle 18 and the heat button 58 is electrically coupled to each of the handle heating coil 40 and the shaft heating coil 42. The heat button 58 turns each of the handle 40 and shaft 42 heating coils on and off. A light button 60 is movably coupled to the handle 18 and the light button 60 is electrically coupled to each of the shaft light emitter 48, the bucket light emitter 50 and the auxiliary light emitter 52. The light button 60 is positionable in a first position having the shaft light emitter 48 being turned on. Additionally, the light button 60 is positionable in a second position has the shaft light emitter 48 and the bucket light emitter 50 is turned on. The light button 60 is positionable in a third position has the shaft light emitter 48, the bucket light emitter 50 and the auxiliary light emitter 52 being turned on.

A communication button 62 is movably coupled to the handle 18 and the communication button 62 is electrically coupled to the communication transceiver. The communication button 62 turns the communication transceiver 56 on and off. A power supply 64 is positioned in the handle 18 and the power supply 64 is electrically coupled to the heat button 58, the light button 60 and the communication button 62. The power supply 64 comprises a least one battery 66 that is positioned within the tubular section 28 of the handle 18. A charge port 68 is recessed into the handle 18 and the charge port 68 is electrically coupled to the at least one battery 66 for charging the at least one battery 66. The charge port 68 may be a usb port or the like and a battery charger 70 can be plugged into the charge port 68 to charge the at least one battery 66.

In use, the heat button 58 is manipulated to turn on each of the handle 40 and shaft 42 heating coils and thusly heat the handle roller 36 and the shaft roller 38. Thus, the user's hands are kept warm while shoveling snow or the like. The light button 60 is manipulated into one of the first, second or third positions to turn on the shaft 48, bucket 50 and auxiliary 52 light emitters. Thus, the user can shovel at night without the need of a flashlight, headlamp or other source of light.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A light emitting shovel assembly being configured to illuminate an area for shoveling in a darkened environment, said assembly comprising:
   a shovel having a shaft, a bucket being coupled to said shaft and a handle being removably coupled to a distal end of said shaft, said bucket being comprised of a translucent material wherein said bucket is configured to pass light therethrough;
   a handle roller being rotatably coupled to said handle wherein said handle roller is configured to be gripped,
   a shaft roller being rotatably positioned around said shaft wherein said shaft roller is configured to be gripped;
   a handle heating coil being integrated into said handle roller such that said handle heating coil is in thermal communication with said handle roller, said handle heating coil heating said handle roller when said handle heating coil is turned on wherein said handle roller is configured to warm the user's hand;
   a shaft heating coil being integrated into said shaft roller such that said shaft heating coil is in thermal communication with said shaft roller, said shaft heating coil heating said shaft roller when said shaft heating coil is turned on wherein said shaft roller is configured to warm the user's hand;

a shaft light emitter being coupled to said shaft wherein said shaft light emitter is configured to illuminate a work area with respect to said bucket;

a bucket light emitter being coupled to said bucket, said bucket light emitter emitting light through said bucket when said bucket light emitter is turned on wherein said bucket light emitter is configured to illuminated the work area with respect to said bucket;

an auxiliary light emitter being coupled to said shaft, said auxiliary light emitter emitting light outwardly from said shaft when said auxiliary light emitter is turned on.

2. The assembly according to claim 1, wherein:

said distal end of said shaft is open, said shaft being hollow;

said bucket has a top edge, a first lateral edge and a second lateral edge, said shaft being coupled to and extending upwardly from said top edge of said bucket;

said bucket light emitter being positioned on said shaft where said shaft joins said top edge of said bucket; and said handle has a tubular section being oriented collinear with a pair of upright sections, each of said upright sections having a distal end with respect to said tubular section, said tubular section having a distal end with respect to said upright sections, said distal end of said tubular section being open, said upright sections spreading away from each other such that said distal end of each of said upright sections is spaced apart from each other, said distal end of said tubular section insertably receiving said distal end of said shaft.

3. The assembly according to claim 2, wherein said handle roller extends between said distal end of each of said upright sections of said handle, said handle roller rotating about an axis extending through said distal end of each of said upright sections.

4. The assembly according to claim 2, further comprising:

a light housing being coupled to said shaft, said light housing having a lens thereon, said lens being angled to point toward said bucket; and said shaft light emitter is positioned within said light housing, said shaft light emitter emitting light outwardly through said lens when said shaft light emitter is turned on.

5. The assembly according to claim 1, further comprising a global positioning system (gps) transceiver being coupled to said handle, said gps transceiver being in wireless communication with a gps for determining a physical location of said handle.

6. The assembly according to claim 1, further comprising a communication transceiver being coupled to said handle, said communication transceiver being in wireless communication with an electronic device for transferring data.

7. The assembly according to claim 6, further comprising a heat button being movably coupled to said handle, said heat button being electrically coupled to each of said handle heating coil and said shaft heating coil, said heat button turning each of said handle and shaft heating coils on and off.

8. The assembly according to claim 7, further comprising a light button being movably coupled to said handle, said light button being electrically coupled to each of said shaft light emitter, said bucket light emitter and said auxiliary light emitter, said light button being positionable in a first position having said shaft light emitter being turned on, said light button being positionable in a second position having said shaft light emitter and said bucket light emitter being turned on, said light button being positionable in a third position having said shaft light emitter, said bucket light emitter and said auxiliary light emitter being turned on.

9. The assembly according to claim 8, further comprising a communication button being movably coupled to said handle, said communication button being electrically coupled to said communication transceiver, said communication button turning said communication transceiver on and off.

10. The assembly according to claim 9, further comprising a power supply being positioned in said handle, said power supply being electrically coupled to said heat button, said light button, and said communication button.

11. The assembly according to claim 10, wherein said power supply comprises:

at least one battery being positionable within a tubular section of said handle; and a charge port being recessed into said handle, said charge port being electrically coupled to said at least one battery for charging said at least one battery, said charge port having a battery charger being plugged therein.

12. A light emitting shovel assembly being configured to illuminate an area for shoveling in a darkened environment, said assembly comprising:

a shovel having a shaft, a bucket being coupled to said shaft and a handle being removably coupled to a distal end of said shaft, said distal end being open, said shaft being hollow, said bucket having a top edge, a first lateral edge and a second lateral edge, said shaft being coupled to and extending upwardly from said top edge of said bucket, said bucket being comprised of a translucent material wherein said bucket is configured to pass light therethrough;

said handle having a tubular section being oriented collinear with a pair of upright sections, each of said upright sections having a distal end with respect to said tubular section, said tubular section having a distal end with respect to said upright sections, said distal end of said tubular section being open, said upright sections spreading away from each other such that said distal end of each of said upright sections is spaced apart from each other, said distal end of said tubular section insertably receiving said distal end of said shaft;

a handle roller being rotatably coupled between each of said upright sections of said handle wherein said handle roller is configured to be gripped, said handle roller rotating about an axis extending through said distal end of each of said upright sections;

a shaft roller being rotatably positioned around said shaft wherein said shaft roller is configured to be gripped, said shaft roller rotating about a longitudinal axis of said shaft;

a handle heating coil being integrated into said handle roller such that said handle heating coil is in thermal communication with said handle roller, said handle heating coil heating said handle roller when said handle heating coil is turned on wherein said handle roller is configured to warm the user's hand;

a shaft heating coil being integrated into said shaft roller such that said shaft heating coil is in thermal communication with said shaft roller, said shaft heating coil heating said shaft roller when said shaft heating coil is turned on wherein said shaft roller is configured to warm the user's hand;

a light housing being coupled to said shaft, said light housing having a lens thereon, said lens being angled to point toward said bucket;

a shaft light emitter being positioned within said light housing, said shaft light emitter emitting light outwardly through said lens when said shaft light emitter is turned on wherein said shaft light emitter is configured to illuminate a work area with respect to said bucket;

a bucket light emitter being coupled to said bucket, said bucket light emitter emitting light through said bucket when said bucket light emitter is turned on wherein said bucket light emitter is configured to illuminated the work area with respect to said bucket, said bucket light emitter being positioned on said shaft where said shaft joins said top edge of said bucket;

an auxiliary light emitter being coupled to said shaft, said auxiliary light emitter emitting light outwardly from said shaft when said auxiliary light emitter is turned on;

a global positioning system (gps) transceiver being coupled to said handle, said gps transceiver being in wireless communication with a gps for determining a physical location of said handle;

a communication transceiver being coupled to said handle, said communication transceiver being in wireless communication with an electronic device for transferring data;

a heat button being movably coupled to said handle, said heat button being electrically coupled to each of said handle heating coil and said shaft heating coil, said heat button turning each of said handle and shaft heating coils on and off;

a light button being movably coupled to said handle, said light button being electrically coupled to each of said shaft light emitter, said bucket light emitter and said auxiliary light emitter, said light button being positionable in a first position having said shaft light emitter being turned on, said light button being positionable in a second position having said shaft light emitter and said bucket light emitter being turned on, said light button being positionable in a third position having said shaft light emitter, said bucket light emitter and said auxiliary light emitter being turned on;

a communication button being movably coupled to said handle, said communication button being electrically coupled to said communication transceiver, said communication button turning said communication transceiver on and off; and a power supply being positioned in said handle, said power supply being electrically coupled to said heat button, said light button and said communication button, said power supply comprising:

at least one battery being positionable within said tubular section of said handle; and a charge port being recessed into said handle, said charge port being electrically coupled to said at least one battery for charging said at least one battery, said charge port having a battery charger being plugged therein.

\* \* \* \* \*